*J. Murry,*

*Wheel Plow.*

No. 113,081.   Patented Mar. 28, 1871.

Witnesses

David R. Smith

Chas. H. Phillips

Inventor

John Murry

By his Atty C. W. M. Smith

United States Patent Office.

JOHN MURRY, OF SILVEYVILLE, CALIFORNIA.

Letters Patent No. 113,081, dated March 28, 1871.

IMPROVEMENT IN GANG-PLOWS.

The Schedule referred to in these Letters Patent and making part of the same.

*To all whom it may concern:*

Be it known that I, JOHN MURRY, of Silveyville, county of Solano and State of California, have invented certain new and useful Improvements in "Gang-Plows;" and I do hereby declare that the following is a full, clear, and exact description of the same, reference being had to the accompanying drawing and letters marked thereon.

My invention relates to that class of gang-plows which has the plows attached to a hinged frame, which is elevated by suitable mechanism when it is desired to lift the plows; and consists in certain details of construction, which will be fully described hereinafter.

In the drawing—

Figure 1:
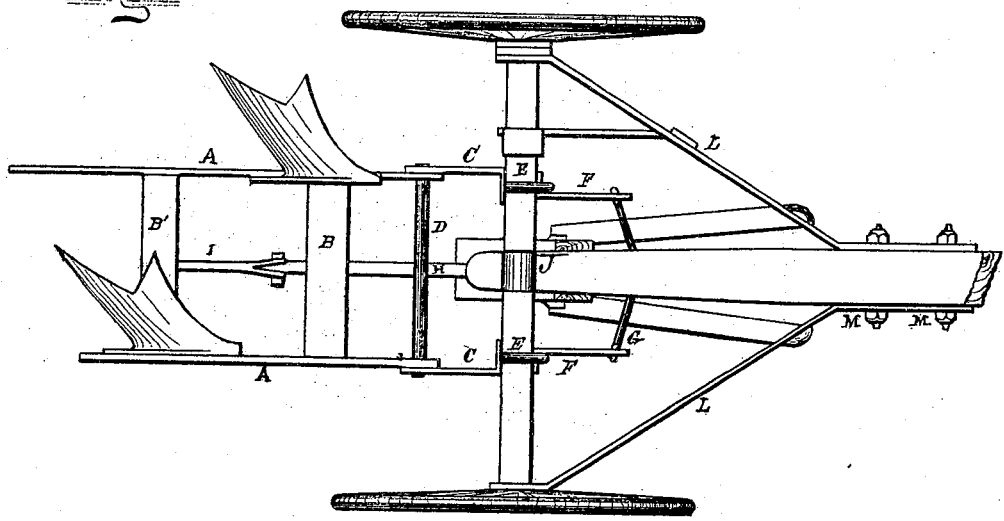
Figure 1 is a bottom view.
Figure 2:
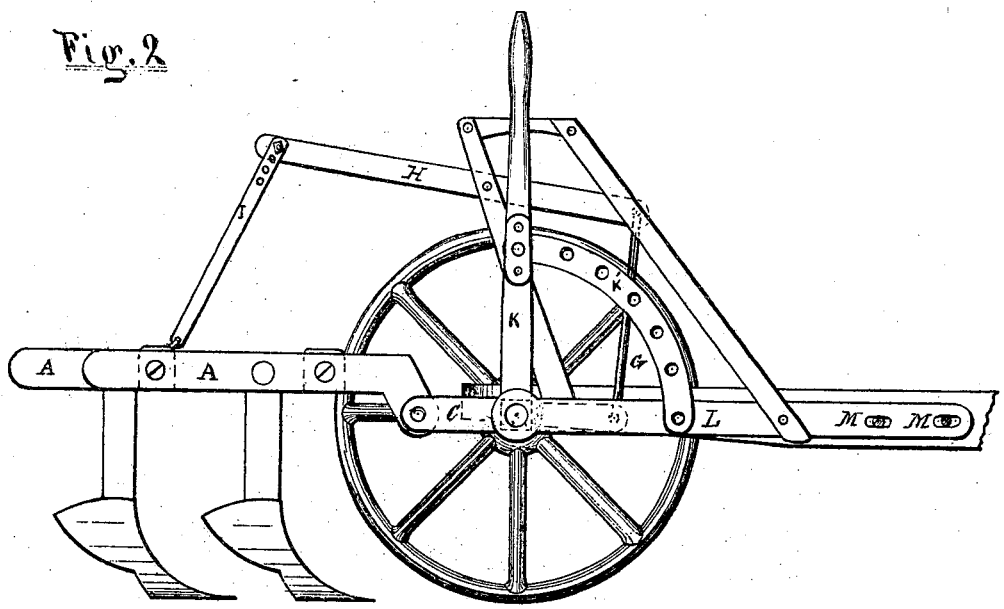
Figure 2 is a side elevation.

To enable others skilled in the art or science to make and use my invention, I will proceed to describe fully its construction and operation.

A represents the sides of the frame to which the plows are attached, and which I construct of flat iron bars placed edgewise, with suitable wood braces B B' between to strengthen the frame and prevent it from springing.

The ends of these bars are bent downward, and are jointed to arms C C by the rod D. I construct my axle in one piece of iron, and the arms which connect with the frame are clipt to it.

The clip E also holds the arms F F, which supports a double brace-rod, G, which passes through a horizontal balance-beam, H. This beam is pivoted to the supports below the driver's box by a pin.

The opposite end of the lever is connected to the brace B' of the frame by a double flat link, I, with holes for raising and lowering the rear end of the plow-frame.

In the center of the axle I make a journal, J, which turns in the end of the draft-pole.

At the right of the driver's seat is attached to the axle a lever, K, and by forcing this lever down the axle turns in the hubs of the wheels nearly half way round and draws down the connecting-rod attached to the end of the balance-beam and raises the whole gang and frame, and still maintaining them in a horizontal position, while the arms C C are nearly in a vertical position, and the balance-beam will be at an angle of about forty-five degrees.

Through the raising and lowering lever passes a segmental arm, k', with pin-holes for holding the plows at the desired height.

For turning the plows to or from land the hounds L L are provided with slots where they connect with the pole, which admits of each being moved backward or forward by unloosening the screw-bolts M M, and by lengthening or shortening the connection of either the frame is given a greater or lesser inclination to the right or left.

The hounds I also construct of iron, the opposite ends of which are simply provided with holes and are sprung upon the axle against the shoulders, being separated from the hubs of the wheels by a washer.

I construct the furrow-wheels of my plow larger than that of the land-wheel, and both wheels may be made of cast-iron.

My plows have flat iron standards, and are attached rigidly to the iron frame, so that strength and durability is imparted to the whole machine.

By raising and dropping the flat link at the end of the balance-beam the whole frame may be folded over against the driver's seat for transportation.

In constructing my gang-plow it will be observed that but a small portion of it is made of wood, and the machine will not be materially injured by exposure to the weather, which is considered a great desideratum in sections of the country where suitable buildings for storing farming implements are rarely ever erected.

Having thus described my invention,

What I claim, and desire to secure by Letters Patent, is—

The arrangement of the frame A, bars C, axle E, lever K, balance-beam H, connecting-rod G, and link I, as described, for the purpose set forth.

In testimony whereof I have hereunto set my hand and seal.

JOHN MURRY. [L. S.]

Witnesses:
C. W. M. SMITH,
E. V. SUTTER.